No. 859,833. PATENTED JULY 9, 1907.
F. L. OWEN.
SPLICING CLAMP.
APPLICATION FILED NOV. 30, 1906.

Witnesses
J. G. Stribbel
J. J. McCarthy

Inventor
Frank L. Owen
by Foster Freeman & Watson
Attorneys

THE NORRIS PETERS CO., WASHINGTON, D. C.

UNITED STATES PATENT OFFICE.

FRANK L. OWEN, OF DES MOINES, IOWA, ASSIGNOR OF ONE-HALF TO O. G. WAFFLE, OF MARION, IOWA.

SPLICING-CLAMP.

No. 859,833.      Specification of Letters Patent.      Patented July 9, 1907.

Application filed November 30, 1906. Serial No. 345,720.

*To all whom it may concern:*

Be it known that I, FRANK L. OWEN, a citizen of the United States, residing at Des Moines, in the county of Polk and State of Iowa, have invented certain new and useful Improvements in Splicing-Clamps, of which the following is a specification.

My invention relates to splicing clamps and has for its object to provide an improved and simplified clamp which is cheap in manufacture and efficient in operation, and to these ends my invention consists in a clamp embodying the various features of construction and arrangement of parts adapted to coöperate and produce results substantially as hereinafter more particularly set forth.

Figure 1:
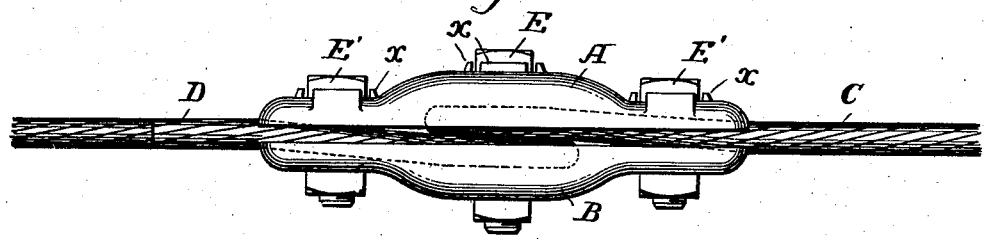
Figure 2:
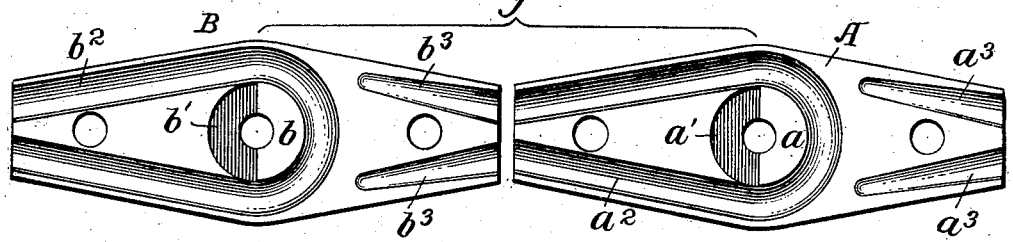
Figure 3:
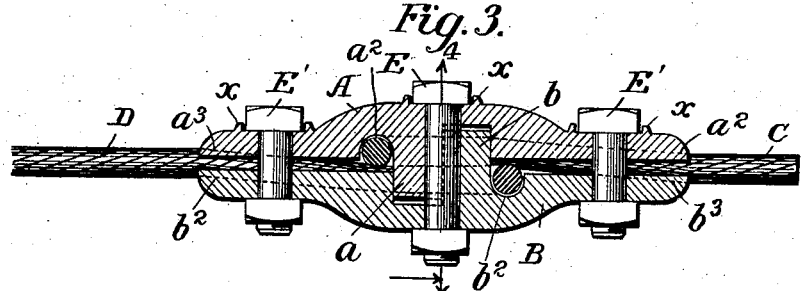
Figure 4:
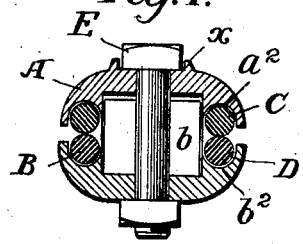

In the accompanying drawing wherein I have illustrated a preferred embodiment of my invention—Figure 1 is a side view of a clamp splicing or connecting two portions of a strand steel cable or rope; Fig. 2 is a plan view of the adjacent faces of the two parts or plates of the clamp, showing their complementary structure; Fig. 3 is a vertical longitudinal section of Fig. 1; and Fig. 4 is a vertical transverse section of Fig. 3 on the line 4—4, looking in the direction of the arrow.

As above indicated, my invention relates to a splicing clamp which is adapted for many and various uses, being shown as splicing the ends of two strand-steel cables or ropes, but it is evident that it can be used for many and various purposes for uniting or splicing guys, ropes, cables and the like, and the details of construction of the parts can be varied to adapt the clamp for the particular purpose intended, without departing from the spirit of my invention.

In the embodiment illustrated in the drawing the clamp comprises essentially two complementary parts or plates A, B, the outer contour of which may vary at pleasure, and the adjacent faces of which are preferably of the same general contour or structure so as to form complementary or overlapping and interlocking portions. In the form disclosed they are alike, except that one of the plates is shown as provided with slight projections $x$ to form sockets for the heads of the confining bolts hereinafter referred to. These projections are not essential features of the invention but when used they prevent the heads of the confining bolts from turning.

Each of the plates A, B are provided with one or more projections or bosses, and in the present instance I have shown the plates as each having a boss or projection $a$, $b$, one face of which is practically on a transverse plane crossing the longitudinal center of the plate or practically at right angles to said longitudinal center, although, of course, its exact location is not material, it being desirable however that the bosses or projections on the two plates, when they are associated to form the clamp, shall overlap each other or interlock with each other. It will be seen that in the present construction opposite one side or face of the boss in each plate is a depression or recess $a'$, $b'$ of a contour to receive the projection or boss of the complementary plate. In this particular instance these projections are shown as semicircular on one side and with flat faces on the other side, so that when the parts are in position the flat faces of the two bosses overlap and interlock, and form what may be termed a two-part stud, made up of the bosses $a$, $b$ of the separate plates. As best seen in Fig. 3, the projections or bosses of the two plates not only have adjacent faces bearing upon each other, but their ends respectively extend into the recess of the other or complementary plate, and in this way the plates are interlocked in a most substantial manner.

When the clamp is used, as for instance in connection with the ends of two cables or ropes, indicated at C, D, it is desirable that the ends of the ropes shall be looped or bent around the projections, or as in this instance, the two-part stud and that these loops shall overlap each other so as to engage this projection or two-part stud on opposite sides thereof. In order to permit this, the faces of the plates are grooved, and in the embodiment shown, the grooves in the face of each plate are precisely alike. Thus in the face of plate A there is a groove $a^2$ which extends from the outer extremities of the plate around the projection $a$ and back again to the extremity, and it gradually deepens or is inclined away from the extremity so that where it surrounds the projection $a$ it is preferably of a depth substantially equal to the diameter of the cable in connection with which it is to be used. Also, on the face of each plate are tapering grooves $a^3$ which extend from the outer edge of the plate inward towards the projections $a$, and these grooves vary in depth, being deeper at the extremity of the plate, and they are preferably of such a form and depth that when the plates are assembled, as indicated in Fig. 3, the tapering grooves $a^3$ of the plate A coöperate with the gradually deepening grooves $b^2$ of the plate B, and the tapering grooves $b^3$ of the plate B coöperate with the grooves $a^2$, and form channels extending from the extremities of the clamp to and around the projections or two-part stud of substantially the same depth, so that the plates bear uniformly upon the surface of the cable or rope D or C when the parts are in clamping position. In this way the complementary grooves form two inclined channels extending from the extremities of the plates to and around the projections or stud, and these, while being of substantially uniform depth throughout, are in parallel planes so that the loops formed in the cable overlap each other around the projections or stud.

The complementary or twin plates may be secured together in any suitable way and I have shown a central bolt E passing through the plates and through recesses formed in the faces of the projections a, b, and this I consider a preferable embodiment of this feature of the invention, as in this construction it will be seen that the bolt acts simply to clamp the two complementary parts together, and that there is no strain tending to shear or cut the bolts, the strain from the loops inclosing the projections or stud being on opposite sides thereof and tending to counterbalance each other and to be mutually resisted by the projections or stud and not by the transverse or other strain upon the bolt. To further secure the parts together, I have shown other bolts E′ near each end of the clamp, as these insure a uniform clamping pressure upon the loops of the cables and avoid any possible tendency to the clamps springing at its end. Such being the preferred embodiment, it is not necessary to illustrate the many modifications that will occur to those skilled in the art in the details of construction, but it will be seen that my splicing clamp comprises, briefly stated, two twin or complementary plates, each plate having a projection or boss engaging which is a loop of the cable, and these projections or bosses are preferably overlapping so as to extend beyond the central line dividing the plate and are further preferably interlocking in that they bear upon each other or upon portions of the plate complementary to that to which they are attached, and thus as in the present embodiment form a two-part stud to receive the overlapping loops in a manner to bear upon opposite sides of the stud; and the plates are further preferably provided with grooves forming practically uniform channels to receive the cable and these grooves are in different planes. In this way not only is there avoided any shearing effect upon the bolt or bolts uniting the parts, but there is practically no shearing effect upon the projections or bosses forming the interlocking projections, as practically the only strain is a crushing strain upon the projections. It will be seen, further, that the clamping device can be made relatively light and still be exceedingly strong, and not be liable to breakage under strains, and the strains upon the ropes have little or no tendency to separate the plates when the parts are interlocked in the manner shown in Fig. 3.

What I claim is:

1. A splicing clamp comprising two plates, each provided with a projection or boss overlapping each other forming a two-part stud extending between the plates when in clamping position.

2. A splicing clamp comprising two plates, each having a recess and a projection or boss overlapping each other forming a two part stud between the plates when clamped together, each projection extending into its opposite recess.

3. A splicing clamp comprising two plates, each provided with a projection or boss having a flat face, the faces engaging each other and the projections or bosses forming a two-part stud extending between the plates when in clamping position.

4. A splicing clamp comprising two plates, each provided with a projection or boss overlapping each other forming a two part stud extending between the plate, and each provided with complementary grooves to form channels around said stud.

5. A splicing clamp comprising two plates each provided with a projection or boss overlapping each other forming a two-part stud extending between the plates, and complementary grooves forming channels in different planes leading from the extremities of the clamp to and around the stud.

6. A splicing clamp comprising two plates, each provided with a projection or boss overlapping each other forming a two-part stud, and complementary grooves forming channels to receive the ends of the rope in the form of overlapping loops engaging the two-part stud on opposite sides, whereby the stud is subjected to a crushing strain.

7. A splicing clamp comprising two plates, each provided with a projection or boss overlapping each other forming a two-part stud, and grooves forming channels in the plates adapted to receive the ends of a rope in the form of overlapping loops engaging the two-part stud on opposite sides and securing means passing through the two-part stud.

8. A splicing clamp comprising two plates, each provided with a projection or boss overlapping each other forming a two-part stud extending between the plates, complementary grooves forming two channels in parallel planes adapted to receive the ends of a rope with overlapping loops engaging the two-part stud, and means for securing the plates together.

In testimony whereof I affix my signature in presence of two witnesses.

FRANK L. OWEN.

Witnesses:
GEORGE READ,
W. H. MATHIS.